Feb. 13, 1968   R. H. KROCK ET AL   3,368,879
TUNGSTEN STRUCTURES
Original Filed Feb. 16, 1966

INVENTORS
RICHARD H. KROCK
EDWARD J. ZDANUK
BY
*Robert Levine*
ATTORNEY

United States Patent Office 3,368,879
Patented Feb. 13, 1968

3,368,879
TUNGSTEN STRUCTURES
Richard H. Krock, Peabody, and Edward J. Zdanuk, Lexington, Mass., assignors to P. R. Mallory & Co., Inc., Indianapolis, Ind., a corporation of Delaware
Original application Feb. 16, 1966, Ser. No. 527,909, now Patent No. 3,320,058, dated May 16, 1967. Divided and this application Mar. 6, 1967, Ser. No. 652,637
1 Claim. (Cl. 29—182.1)

ABSTRACT OF THE DISCLOSURE

A tungsten structure having an impervious skin of tungsten particles coated with nickel. The impervious skin has a substantially uniform depth and surrounds and is integral with a sintered core of tungsten having controlled porosity.

---

This is a division of application Ser. No. 527,909, filed Feb. 16, 1966, now Patent No. 3,320,058.

The present invention relates to powder metallurgy processing and more particularly to means and methods for fabricating tungsten structures having high density outer surfaces and a core of controlled porosity. The armored tungsten structures are produced by coating the surfaces of a tungsten specimen with nickel and thereafter sintering the nickel coated tungsten specimen in a vacuum so as to produce a tungsten structure having a core of controlled porosity surrounded by and integral with a dense, impervious tungsten skin.

Structures having a dense, impervious skin and a core of controlled porosity have several applications including for example ion emitters, permeable membranes, conduit means for fluids such as, for example, gases and liquids, and fluid filters. The several applications require that the tungsten structure have a core of controlled porosity and a dense, impervious skin.

Attempts have been made to utilize fibrous materials such as paper as filters, but the fibrous materials were found to be an inadequate means for controlling the flow rate of fluid. Porous structures with a dense skin have been provided by several methods including the placing of sleeves thereabout, encapsulating, and the deposition of a dense material on the surface of the porous structure. Some of the methods are difficult to carry out and maintain the desired porosity of the core while others may introduce deleterious material into the porous core which affects the permeability thereof.

It is known that compacted tungsten powder specimens show little densification during fabrication at temperatures of about 1100° Centigrade, and as a result, are not usable in situations calling for high density materials where the tungsten structures would be otherwise desirable. However, it was found that by thoroughly mixing a small amount of nickel powder, generally ranging from 0.001 to 0.50 percent by weight with the tungsten powder, pressing, and sintering from about 1000° to about 1400° centigrade on the order of from about a few minutes to several hours will suffice to obtain high density tungsten structures. Varying the sintering time and temperature will vary the depth of the tungsten skin, that is, a lower sintering temperature and/or less sintering time will produce a tungsten body having a thinner skin than a higher sintering temperatures and/or a longer sintering time. The density achieved was about 98.5 percent of the theoretical density and was substantially uniform throughout the sintered tungsten structure. It is apparent that a small percentage of nickel is instrumental in activating the sintering of tungsten. It is thought that the nickel activates the sintering by lowering the activation energy for solution and/or diffusion of tungsten, which gives rise to sintering and densification.

The above disclosed means and method is adequate if the desired end result is a tungsten structure having a uniform high density throughout the structure. However, the above outlined procedure does not readily lend itself to the fabrication of porous tungsten structures having a high density outer surface.

Therefore, it is an object of the present invention to provide a means and method of producing armored structures in tungsten specimens.

Another object of the present invention is to provide an armored tungsten structure having an impervious skin of predetermined depth which is integral with the porous core of the tungsten structure.

A further object of the present invention is to provide a means and method of fabricating an armored tungsten structure in both a practical and economical manner.

Yet still another object of the present invention is to provide an improved method of producing an integral tungsten specimen having a high density skin and a low density core.

Another object of the present invention is to provide an armored tungsten structure in which small amounts of nickel are incorporated into the skin of the tungsten specimen so as to provide a tungsten structure having an impervious skin of uniform depth and a porous core.

The present invention, in another of its aspects, relates to novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description and appended claims. The invention resides in the novel combination of elements and in the means and method of achieving the combination as hereinafter described and more particularly as defined in the appended claims.

Figure 2:
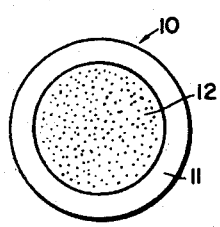
FIGURE 2 is an end view of the armored tungsten body illustrated in FIGURE 1.

Generally speaking, the means and method of the present invention relate to a porous tungsten structure having an impervious skin of nickel-coated tungsten particles. The depth of the skin is small in comparison to the thickness of the tungsten specimen.

The method of making the tungsten structure having armored surfaces and a porous core comprises the steps of compacting the powdered tungsten particles into a desired specimen shape. The tungsten specimen is sintered in a hydrogen atmosphere and, thereafter the sintered tungsten specimen has its surfaces coated with nickel. If a more porous tungsten core is desired, nickel powder is placed in a spinning mold. The centrifugal force of the spin-mold causes the nickel powder to be uniformly distributed over the inner surface of mold. Tungsten powder is placed in the mold and the powder takes the shape of the mold. Another example of a porous core is to cement the tungsten particles together using a binder material. The specimen of loose tungsten powder is coated with nickel powder. The nickel coated tungsten specimens are sintered in a vacuum or hydrogen atmosphere so as to sinter together surface particles of the tungsten forming pore-free armored surfaces surrounding and integral with a porous core of sintered tungsten particles. In addition, tungsten powder may be compacted and the resultant green compact coated with nickel. The nickel coated green tungsten compact is sintered in a vacuum or hydrogen atmosphere so as to form a tungsten structure having pore-free armored surfaces about a porous core of fused tungsten particles.

More particularly, the powdered tungsten used to fabricate the tungsten specimen has a particle size ranging between 3.5 to 4.5 microns or larger. The powdered tungsten particles are compacted into tungsten specimens by pressures ranging between 20 and 35 tons per square inch. Powdered nickel is dusted on the surfaces of the tungsten specimens. However, if it is desired to increase the density of the green tungsten compact prior to dusting powdered nickel on the surfaces of the tungsten compact, the compact is presintered in a hydrogen atmosphere at about 1250° centigrade for about 10 minutes. The nickel coated tungsten specimens are sintered at a temperature of about 1100° C. to about 1400° C. for about 30 minutes to about 1 to 4 hours in a vacuum or hydrogen atmosphere so as to fuse the surface particles of the tungsten structure thereby forming pore-free armored surfaces, yet allowing the core of the tungsten structure to remain porous.

In carrying out the present invention, tungsten powder having a particle size ranging from about 3.5 to 4.5 microns or larger is compacted by any suitable powder metallurgy technique such as by compacting within the confines of a die in a hydraulic or an automatic press or by placing the powder in a rubber or a plastic mold and compacting in a hydrostatic press. The particle size of the tungsten is not critical and therefore is limited only by the desired porosity of the core of the tungsten structure. By way of illustration, if tungsten powder having a particle size of about 100 microns is utilized, the resultant tungsten structure would have a fluid flow rate less than that of a tungsten structure using tungsten powder having a particle size of about 200 microns or larger, if the same overall density is obtained.

The compacting pressure utilized may vary, however it was found that the higher the initial compacting pressure resulted in a less porous tungsten core. It was found that compacting pressures from about 20 tons per square inch to about 35 tons per square inch were suitable for obtaining green tungsten bodies strong enough to handle. However, it is pointed out that the compacting pressure used to form the green compact is critical only when it is desirable to accurately control the porosity of the core of the resultant armored structure. The higher the initial compacting pressure, the more dense is the resultant core of the armored structure assuming the sintering time and temperature remain constant for all structures. Prior to dusting with nickel powder, the green compact may be presintered in a hydrogen atmosphere at about 1250° C. for about 10 minutes. The additional step of presintering serves to make the core less porous and also serves to significantly increase the strength of the core. If a core of maximum porosity is desired, the tungsten powder is placed in a mold coated with nickel powder so as to form the loose powder into a desired specimen shape. An armored structure having a core porosity falling between the aforementioned examples would be one wherein the tungsten powder was compacted under a suitable compacting pressure thereby forming a green tungsten compact which has its surfaces dusted with nickel powder. Any suitable means may be utilized to coat the periphery of the tungsten specimen with a nickel powder. Dusting, spraying, immersing and the like of the tungsten specimen are but a few acceptable means that can be used to coat the surfaces of the tungsten specimen with powdered nickel. The amount of nickel powder necessary to coat the periphery of the tungsten specimen will vary in accordance with the surface area of the specimen.

In sintering the tungsten specimen, the sintering temperature utilized should fall between 1100° and 1400° centigrade. If the sintering temperature falls below about 1000° C., the sintering time lengthens considerably, and it was found that excessive sintering time durations were required to achieved a tungsten structure having a pore-free skin integral with a porous core. Also, it was found that if the sintering temperature exceeded about 1500° C., a liquid phase resulted from the formation of an eutectic composition between the nickel and the tungsten.

Figure 1:
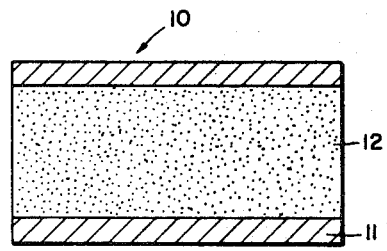
FIGURE 1 is a cross-sectional view illustrating the pore-free skin and the porous core of a cylindrical body.

The resultant tungsten structure is illustrated in FIGURES 1 and 2 wherein a cylindrical-shaped condiut means 10 has a surface 11 that is armor, that is, a pore-free skin of determined depth and a core 12 that is porous. It was found that the depth of the pore-free skin can be accurately controlled by varying the sintering time and temperature. Pore-free skins having uniform depths of about .001 inch have been produced as well as pore-free skin having a uniform depth of about .030 inch. It will be understood that the shape of the tungsten body may be square, rectangular, circular or the like, and that the cylindrical body shown in FIGURES 1 and 2 is illustrative only of a shape of the tungsten body.

Figure 3:
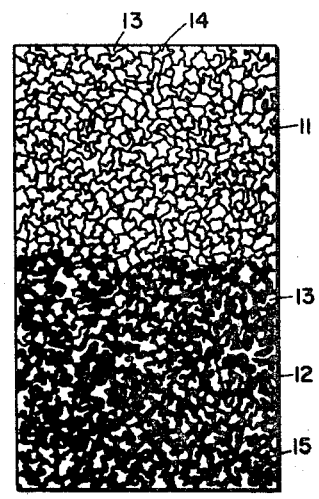
FIGURE 3 is a photomicrograph of the armored tungsten body illustrating the junction between an impervious skin of tungsten of uniform depth and a core of tungsten of controlled porosity.

FIGURE 3 illustrates the junction between the impervious skin 11 and the porous core 12. The impervious skin consists of tungsten particles 13 coated with nickel 14. The porous core consists of a void area 15 and tungsten particles 13 that are not coated with nickel.

The following Examples 1–5 are illustrative of the preparation of tungsten structures having an impervious or armored skin.

Example 1

A quantity of tungsten powder having a particle size of 3.5 to 4.5 microns was pressed by any suitable means such as by an automatic press at any suitable pressure to provide a green compact of determined configuration. It was found that a pressure of about 20 tons per square inch was adequate to form a green tungsten compact. The surface of the green tungsten compact was dusted with powdered nickel so as to adequately cover the periphery thereof. The compact was then sintered in a vacuum atmosphere of about $10^{-5}$ torr for about 4 hours at about 1100° C. The nickel coating on the surface of the tungsten body caused nickel-activated sintering of the surface of the tungsten body thereby producing a tungsten body having a porous core and an impervious skin. The impervious skin had a substantially uniform thickness of about .020 inch.

Example 2

The procedure of Example 1 was followed in preparing a tungsten body having an impervious skin and a porous core using a compacting pressure of about 35 tons per square inch.

Example 3

A quantity of tungsten powder having a particle size of 3.5 to 4.5 microns was pressed by any suitable means such as by an automatic press at any suitable pressure to provide a green compact of determined configuration. It was found that a pressure of about 35 tons per square inch was adequate to form a green tungsten compact. The surface of the green tungsten compact was dusted with nickel powder so as to adequately cover the periphery thereof. The compact was then sintered in a vacuum atmosphere of about $10^{-5}$ torr at about 1400° centigrade for about 30 minutes. The nickel coating on the surface of the tungsten body caused nickel-activated sintering of the surface of the tungsten body thereby producing a tungsten body having a porous core and an impervious skin. The impervious skin had a substantially uniform thickness of about .020 inch.

Example 4

A quantity of tungsten powder having a particle size of 3.5 to 4.5 microns was compacted at about 35 tons per square inch to form a green tungsten compact. The green tungsten compact was presintered in a hydrogen atmosphere for about 10 minutes at 1250° centigrade. The sintered tungsten compact was ducted with powdered nickel so as to adequately cover the periphery thereof. The compact was then sintered in a vacuum atmosphere of about $10^{-5}$ torr for about 30 minutes at 1400° centigrade. The nickel coating on the surface of the tungsten body caused nickel-activated sintering of the surface of the body thereby producing a tungsten body having a porous core and an impervious skin.

Example 5

A quantity of tungsten powder having a particle size of 3.8 to 4.5 microns was placed in a suitable mold which was previously coated with nickel powder. The specimen was sintered in a vacuum atmosphere of about $10^{-5}$ torr for about 4 hours at about 1100° centigrade. The nickel coating next to the surface of the tungsten body caused nickel-activated sintering of the surface of the tungsten specimen thereby producing a tungsten specimen having a porous core and an impervious skin.

It is seen that sintering in vacuum atmospheres of the tungsten specimens dusted with powder nickel for about 30 minutes to 4 hours at temperatures between 1100° and 1400° centigrade results in a tungsten armored structure.

The present invention is not intended to be limited to the disclosure herein, and changes and modifications may be made by those skilled in the art without departing from the spirit and the scope of the present invention. Such modifications and variations are considered to be within the purview and scope of the invention and the appended claim.

Having thus described our invention, we claim:

1. A tungsten structure comprising: an impervious skin of tungsten particles coated with nickel, said impervious skin having a substantially uniform depth and surrounding and integral with a sintered core of tungsten having controlled porosity.

References Cited

UNITED STATES PATENTS

| | | | |
|---|---|---|---|
| 2,669,008 | 6/1951 | Levi | 29—182.1 X |
| 3,022,187 | 2/1962 | Eyraud | 29—182.2 X |
| 3,226,263 | 12/1965 | Oswin | 75—222 X |

CARL D. QUARFORTH, *Primary Examiner.*

A. J. STEINER, *Assistant Examiner.*